United States Patent
Purcell

(10) Patent No.: US 7,137,223 B1
(45) Date of Patent: Nov. 21, 2006

(54) FILLING STATION FOR WATERING CANS

(76) Inventor: Douglas K. Purcell, 279 Casey Dr., Chicopee, MA (US) 01020

( * ) Notice: Subject to any disclaimer, the term of this patent is extended or adjusted under 35 U.S.C. 154(b) by 0 days.

(21) Appl. No.: 10/795,165

(22) Filed: Mar. 4, 2004

(51) Int. Cl.
*A01G 29/00* (2006.01)

(52) U.S. Cl. ........................................ 47/48.5; 47/62 E

(58) Field of Classification Search ................ 47/48.5, 47/58.1 R, 1.01 R, 62 R, 62 E, 79, 66.6, 47/40.5
See application file for complete search history.

(56) References Cited

U.S. PATENT DOCUMENTS

| | | |
|---|---|---|
| 649,436 A | 5/1900 | Cooper |
| 810,034 A | 1/1906 | Cerruti |
| 1,270,731 A | 6/1918 | Healy |
| 2,274,678 A | 3/1942 | Eliason |
| 2,772,067 A | 11/1956 | Wilson |
| 2,872,075 A | 2/1959 | Steiner |
| 4,138,967 A | 2/1979 | Tamborrino |
| 4,606,373 A | 8/1986 | Noland |
| 4,628,867 A | 12/1986 | Brougham et al. |
| 4,708,264 A | 11/1987 | Bruninga |
| 5,553,636 A | 9/1996 | Hoeptner, III et al. |
| 5,582,132 A * | 12/1996 | Morton ........................ 119/80 |
| 6,279,508 B1 | 8/2001 | Marchant et al. |
| 6,442,893 B1 * | 9/2002 | Lai ............................ 47/62 R |

FOREIGN PATENT DOCUMENTS

| | | | |
|---|---|---|---|
| FR | 2657496 | * | 8/1991 |
| GB | 2 322 464 A | | 8/1998 |

* cited by examiner

*Primary Examiner*—T. Nguyen
(74) *Attorney, Agent, or Firm*—McCormick, Paulding & Huber LLP

(57) ABSTRACT

A filling station for watering cans comprises a water tank with a closable lid. A float valve mechanism is attached to the inside of the tank, and is connected to a water line or hose. In use, the filing station is placed in a garden area, with the hose running between the float valve and a house water spigot. Subsequently, the spigot is turned on (and is left on), supplying water to the float valve. The float valve allows water into the tank until the tank is full. For watering, the cover is opened, exposing the water and a dipping area, which is dimensioned to accommodate a conventional watering can. Then, the watering can is dipped into the water until full, and is used to water plants. When the water level in the tank falls below a certain level, the float valve automatically activates to refill the tank.

15 Claims, 4 Drawing Sheets

FILLING STATION FOR WATERING CANS

FIELD

The present invention relates to devices and methods for irrigating plants, and, more specifically, to devices and methods for storing and supplying water for hand irrigation.

BACKGROUND

In watering plants around the home, several systems and/or methods are commonly used. These include dedicated watering lines (e.g., drip irrigation), area distribution devices (e.g., sprinklers), moveable hoses, and watering cans.

Drip irrigation and similar systems typically comprise a network of permanently stationed hoses which run from a house water supply (hose bib or spigot) to a number of plants. Because the hoses are typically cut to specific lengths, they are not amenable to being moved around to different plants after installation. Accordingly, this method is mainly appropriate for permanent or non-seasonal plants. Moreover, installation costs can be significant.

In the case of area distribution systems, one or more permanent or moveable sprinklers are attached to or set against the ground, and are supplied water via a portable hose or an underground, dedicated water line. In use, water is uniformly sprayed over a large area. This method is suitable for watering ground cover (such as grass), but is ill-suited for watering discreet plants. This is because: (i) water may be applied to areas where it is not needed; (ii) an increased amount of water is lost due to evaporation; (iii) most of the water is not applied to the root area of the plants; and (iv) a significant percentage of water is applied to plant foliage, which can lead to sunburn and similar problems.

Because sprinklers and drip systems have limited, specific uses, most gardeners utilize portable hoses and/or watering cans to water plants in the garden. In the case of the former, a hose is dragged sequentially from plant to plant. While functional, this method is ill-suited for those who cannot easily move a hose, heavy by itself and even more so filled with water, from plant to plant. Moreover, unless some sort of shutoff valve is used, water is wasted when moving between plants. Additionally, the gardener is at the mercy of the supply-line pressure, i.e., he or she has to spend a significant amount of time at each plant waiting for the appropriate amount of water to be discharged from the hose.

In the case of the latter, watering cans are small containers, typically having some sort of handle and water discharge spout, that can be filled with water and easily moved from plant to plant for watering. Watering cans are quite effective for applying water accurately, speed of application, and portability. However, they have to be frequently refilled, which can lead to certain problems. For example, if a hose is used for refilling, the refilling process can take quite a bit of time. Additionally, if a rain barrel is used as the water source (rain barrels are large barrels or other containers, located under a house's gutter downspouts, that collect rain water for later use), it is necessary to make a number of back-and-forth trips from the garden or plant area to the rain barrel. Moreover, without significant, frequent rainfall, rain barrels run out of stored water quite quickly. Furthermore, if a watering container is too large or awkward to fit into the barrel, the barrel's lower drain valve has to be used, which is typically very slow (low pressure).

Accordingly, a primary object of the present invention is to provide a method and system that allows for the quick refilling of watering cans, in close proximity to a garden area, and that is largely independent of supply-line water pressure.

SUMMARY

A filling station for watering cans comprises a water tank with a closable lid. A standard float valve mechanism is attached to the inside of the tank, and is connected to a conventional water line or hose. In use, the filing station is placed in a garden area, with the hose running between the float valve and a house water spigot. Subsequently, the spigot is turned on (and is left on), supplying water to the float valve. The float valve allows water into the tank until the tank is full. For watering, the cover is opened, exposing the water and a dipping area, which is configured in size and shape to accommodate a conventional watering can. Then, the watering can is dipped into the water until full, and is used to water plants. When the water level in the tank falls below a certain level, the float valve automatically activates to refill the tank.

The watering can may be left inside the tank when not in use. As such, the tank acts as a convenient storage place for the watering can, resulting in less yard clutter and obviating the need for a separate storage location for the watering can. For added safety, the watering can and tank may be complementary shaped, so that the watering can: (i) blocks the tank/dipping area when stored in the tank; and/or (ii) occupies substantially the entirety of the tank when stored in the tank, in either case preventing small children and pets/animals from falling into the tank interior. Also, for safety, the lid may be provided with a child-proof lock, and the tank exterior outfitted with warning signs and the like.

DETAILED DESCRIPTION

Figure 1:
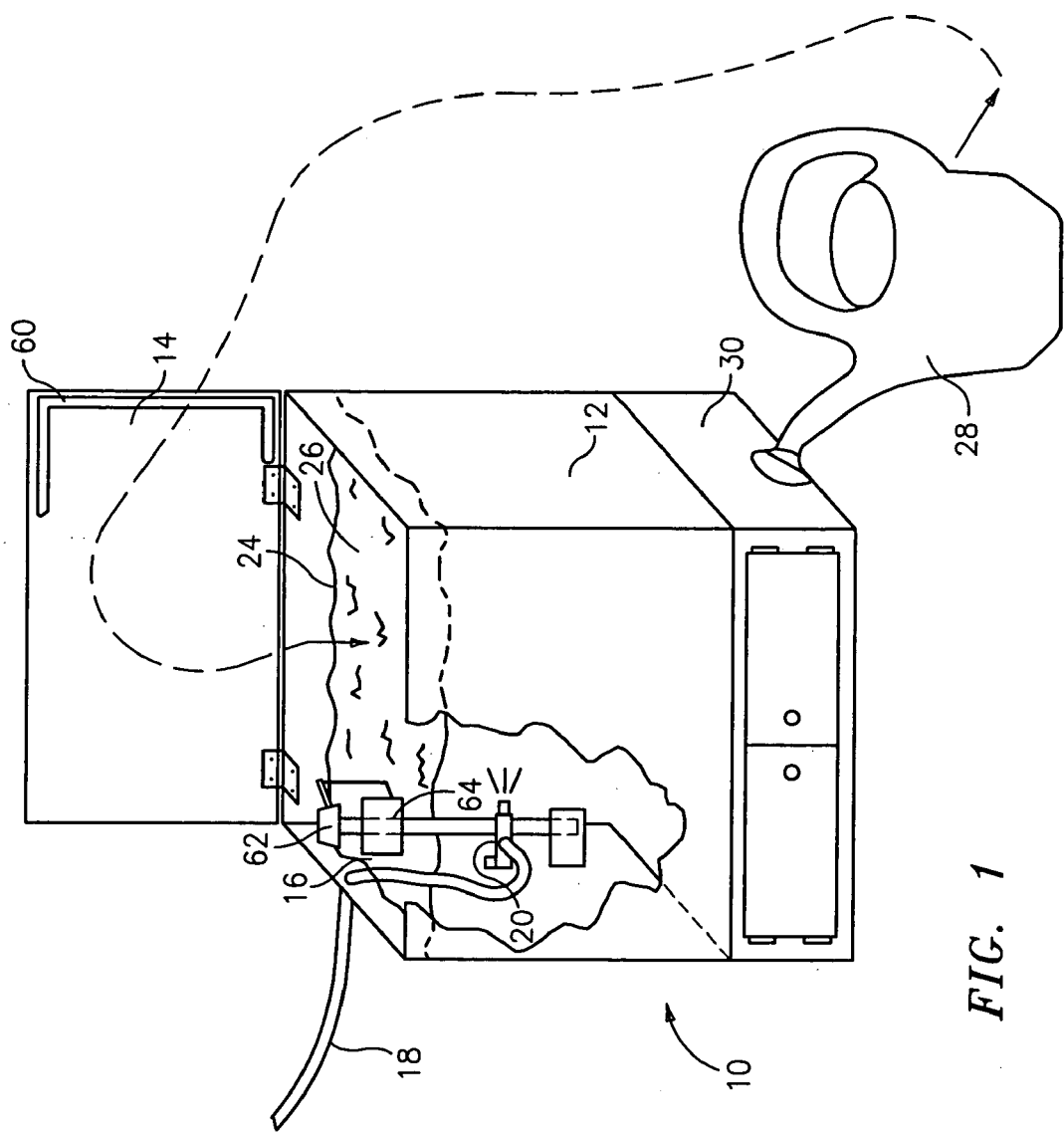
FIG. 1 is a perspective view, partly in cut-away, of a first embodiment of a filling station for watering cans according to the present invention.
Figure 1:
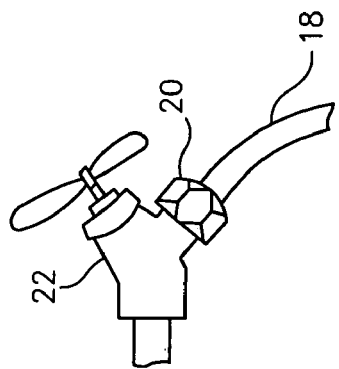

With reference to FIG. 1, a first, preferred embodiment of a filling station for watering cans 10 comprises a tank 12 with a closable lid 14. A standard float valve mechanism 16 is attached to the inside of the tank 12, and is configured to be operably connected to a conventional water line or hose 18 by way of a standard, screw-on connector 20. In use, the filing station 10 is placed in or near a garden area, with the hose 18 connecting the float valve 16 to a house water spigot 22 or similar permanent water source. Subsequently, the spigot 22 is turned on (and is left on), supplying water to the float valve 16. The float valve 16 allows water into the tank 12 until an upper water line 24 (a pre-established water level) is reached. For watering, the cover 14 is opened, exposing the water and a dipping area 26, which is adapted in size and shape to accommodate a conventional watering can 28. Then, the watering can 28 is dipped into the water until full, and is used to water plants. When the water level in the tank 12 falls below a certain level, the float valve 16 activates to refill the tank 12.

As should be appreciated, this system is particularly advantageous in that it establishes a permanent source of water, suitable for rapidly filling a watering can multiple times, in a garden area. As such, it is particularly useful in situations where: (i) it is not possible to have a permanent water line and spigot installed in a garden area; (ii) the gardener is unwilling or unable to move heavy, bulky hoses; (iii) the water pressure from the spigot is low (i.e., since the tank has a reservoir, it provides a supply of water largely independent of the rate water is supplied from the spigot); (iv) quick filling is desired, i.e., the gardener does not have to wait for water from a hose or spigot to fill a watering container; and/or (v) the plants in question are difficult to access, e.g., hanging plants. The filling station 10 is also advantageous in that chemicals in the water, e.g., chlorine, may have a chance to evaporate or dissipate if the water sits in the tank long enough. Additionally, the temperature of water in the tank will gradually move to ambient levels, which can be beneficial for plants.

The tank 12 may be constructed of various materials (plastic, wood, metal, etc.), and is sized and shaped to provide a sufficient volume of water (at least about 8 gallons, i.e., at least 8±1 gallons) for refilling the watering can 28 multiple times, even if the water supply line pressure is low. The tank 12 is also dimensioned to accommodate the float valve 16, and to provide the dipping area 26, which, as mentioned above, accommodates the watering can 28. Additionally, the tank 12 may be of any height as desired, provided there is enough water volume, as well as space sufficient for the watering can. When not in use, the watering can may be stored inside the tank, submerged in the water.

The tank 12 may be freestanding (i.e., sitting on the ground), or, depending on tank height, it may be positioned on top of a riser or platform 30. The riser 30 would serve to elevate the tank 12, if needed, to make it more accessible to those unable to bend over. Additionally, the riser 30 would serve as a convenient under-tank storage area. In either case (freestanding or not), the top of the tank 12 is positioned high enough so that when the lid is open, the water cannot be easily accessed by young children or pets.

Figure 2:
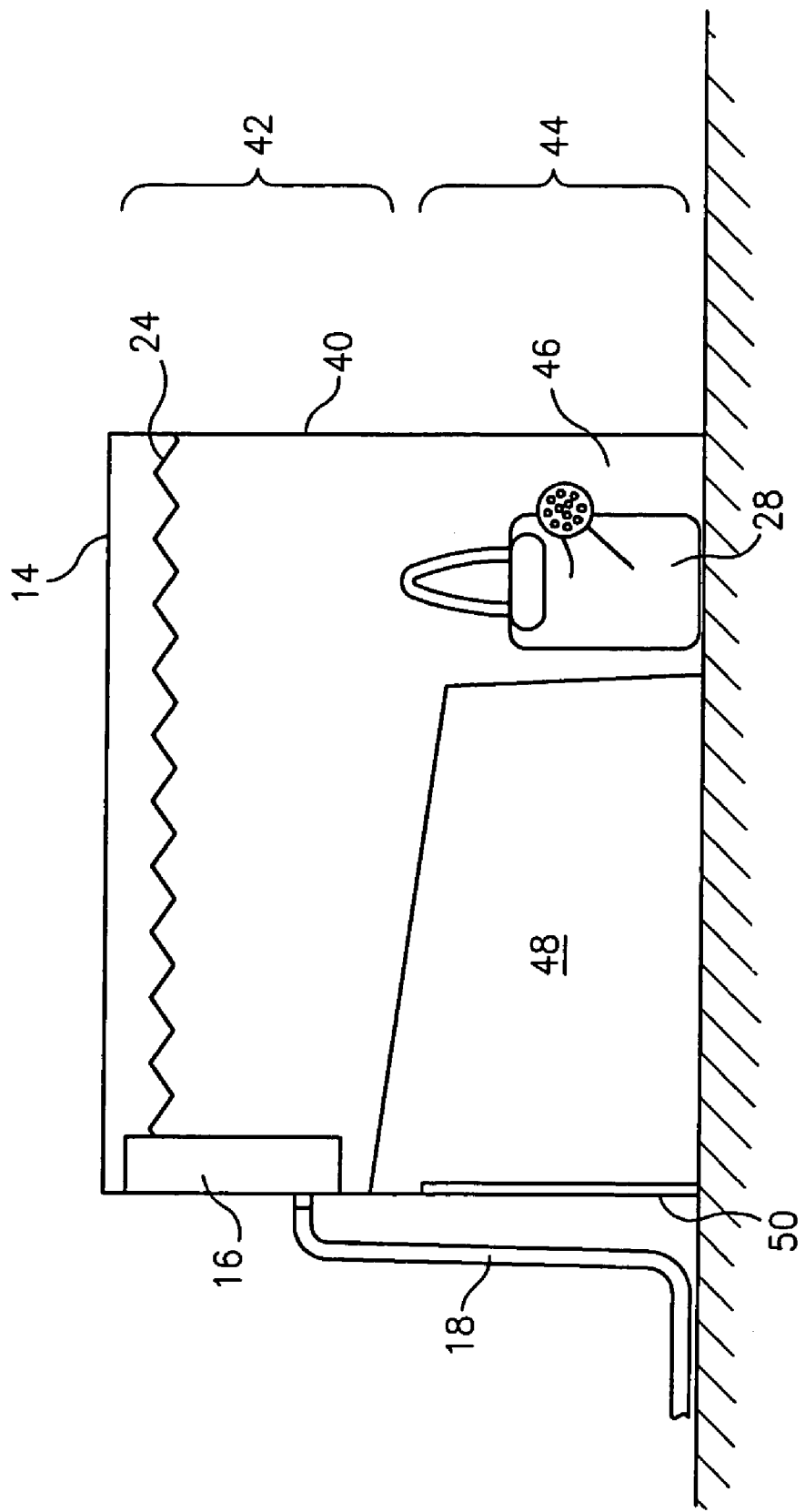
FIG. 2 is a conceptual, side elevation view of an alternative embodiment of a tank portion of the filling station for watering cans shown in FIG. 1.

FIG. 2 shows a second, alternative tank 40 for use with the filling station 10. Here, the tank 40 is freestanding, and includes an upper portion 42 that is similar in overall size and shape to the first tank 12 (i.e., it offers a similar water volume and the dipping area 26). However, the second tank 40 also includes a lower portion 44, which is divided into a dipping channel 46 and a built-in storage area 48. The storage area 48 is accessible via a door 50. The dipping channel 46 is integral with the upper water portion 42, and provides a space where the watering can 28 can be positioned below the bulk of the water, as shown. This facilitates in filling the watering can 28 when the water level in the tank 40 is significantly lowered, which may happen if the water supply line pressure is low and/or the watering can 28 is refilled a number of times in rapid succession.

As mentioned above, the watering can may be left inside the tank when not in use. As such, the tank acts as a convenient storage place for the watering can, resulting in less yard clutter and obviating the need for a separate storage location for the watering can.

For added safety, the watering can 28 and tank 40 may be shaped complementary to one another, so that the watering can 28: (i) blocks the tank/dipping area when stored in the tank; and/or (ii) occupies substantially the entirety of the tank when stored in the tank, in either case preventing small children and pets/animals from falling into the tank interior. In such an embodiment, with reference to FIG. 2, the tank 40 would only have the dipping channel 46 (or a similarly-restricted space) and not the large upper portion 42. The watering can 28 would be dimensioned/shaped to fit in, and substantially occupy the entirety of, the dipping channel. Of course, the specially-dimensioned watering can 28 and tank 40 would be provided together to a user.

For further enhancing safety, the lid may be provided with a child-proof lock (not shown), and the tank exterior outfitted with warning signs and the like (not shown).

Turning back to FIG. 1, the tank lid 14 is moveable between a closed position, where the tank is covered, and an open position, where the tank is uncovered and the dipping area 26 is exposed. When closed, the lid 14 prevents debris from falling into the water. It also prevents insects (mosquitoes) and larger animals from accessing the water. Accordingly, when the tank is not in use, the lid should be kept closed. When closed, the lid abuts the tank rim. This should provide an adequate seal, assuming the tank rim and lid are sufficiently planar. If not, a seal member 60 (foam, plastic, or rubber stripping, etc.) may be attached to the tank rim or lid underside. A latch, lock, or the like (not shown) may be provided for securing the lid in its closed position.

As mentioned above, the float valve 16 is a standard float valve unit (e.g., a Fluidmaster® toilet fill valve) that includes a valve portion 62 operably connected to a float 64. The float 64 tracks the water level in the tank 12. When the float 64 is at an upper position corresponding to the upper water line 24, the valve portion 62 is closed, and no water flows into the tank 12 from the hose 18. When the water in the tank 12 falls below the upper water line 24 by some predetermined amount, the float 64, correspondingly lowered, causes the valve portion 62 to open, allowing water to flow into the tank 12. When the water level again reaches the upper water line 24, the valve 62 shuts off.

The float valve 16 is connected to the house spigot 22 via the hose 18. As such, the float valve 16 is provided with a hose connection adapter 20 for attaching the hose 18 to the float valve. The valve's connection adapter may be located inside the tank 12, such that a user would insert the hose 18 into the tank through a small aperture provided for that purpose. Alternatively, the valve's connection adapter may be positioned external to the tank 12, such that a user would not have to access the interior of the tank for attaching the hose 18 to the float valve unit 16. As should be appreciated, any number of hose/water line connection mechanisms, as well as different types of hoses/water lines, could be used in place of the standard hose 18 and adapters 20. For example, the float valve could be directly permanently or semi-permanently connected to a dedicated water line. Also, the float valve 16 may be provided with a removable cover (not shown) so that it is partially compartmentalized from the remainder of the tank 12.

The watering pot 28 can be a standard watering pot or any other container. However, the watering pot 28 can be especially adapted (i.e., dimensioned in size and shape) for fitting into the tank 12, for higher capacity, and/or for rapid filling. Also, the tank 12 will typically have a large enough interior volume to accommodate standard-sized, medium/large capacity watering cans, i.e., those having a capacity of 1–3 gallons. Smaller tanks 12 can be used (i.e., smaller space, easier to move), but at a sacrifice in versatility, since medium/large watering cans could not be used.

Other features (not shown) that may be provided with the filling station 10 include: (i) a sign or other indicia on the outside of the filling station indicating that the contents are not suitable for drinking (either static, or changeable between different indications, e.g., "potable" and "non-potable"); (ii) a water drain valve; and (iii) a built-in stirrer or agitator for mixing in water-soluble fertilizer.

As mentioned above, for use, the filling station 10 is placed in or near a garden plot or other area of plants, and is connected to the house water supply using the hose 18. As such, the filling station can be located any distance away from the house or other water supply. Once the water source is activated (e.g., the spigot is turned on), if necessary, water is maintained within the tank 12 at the upper level 24 via the float valve 16. For watering, a gardener opens the lid 14 and dips the watering can 28 into the tank 12 to obtain water for watering plants. This operation is very quiet, very fast, and quite ergonomic (i.e., since the tank is designed to accommodate the watering container, removing water from the tank is very easy). As the water in the tank is removed, the tank is automatically refilled via the float valve. Then, the water in the watering can be accurately and quickly applied to plants, which promotes water conservation.

In light of the above, the present invention also effectuates a method or process for watering plants and/or filling watering containers. First, water is supplied to a reservoir (the tank 12) positioned near a garden area or other plants. The water comes from a remote, permanent supply, e.g., the house spigot 22, and is delivered to the reservoir by way of the hose 18 or other water line. Then, the reservoir is automatically filled with water up to a predetermined first level, e.g., the upper line 24. This is accomplished using the float valve 16, which is operably connected to the reservoir. Subsequently, a gardener accesses the reservoir (e.g., by opening the lid 14), and dips a portable water container (e.g., the watering can 28) into the reservoir to quickly fill the water container with water from the reservoir. Then, the gardener applies the water in the portable container to the plants near the reservoir, or to other plants. For example, because the amount of water in the watering canister can be easily varied, and the watering canister can be easily manipulated, the method is particularly suited for watering difficult to access plants, e.g., hanging plants. Finally, when the water in the reservoir falls below a second, lower level, the reservoir is automatically refilled back up to the first level (again, by the float valve). The method may also include the step of placing a standard time-release fertilizer disk and/or bulk water-soluble fertilizer into the reservoir (tank 12), so that water removed from the tank for watering is pre-fertilized.

Figure 3:
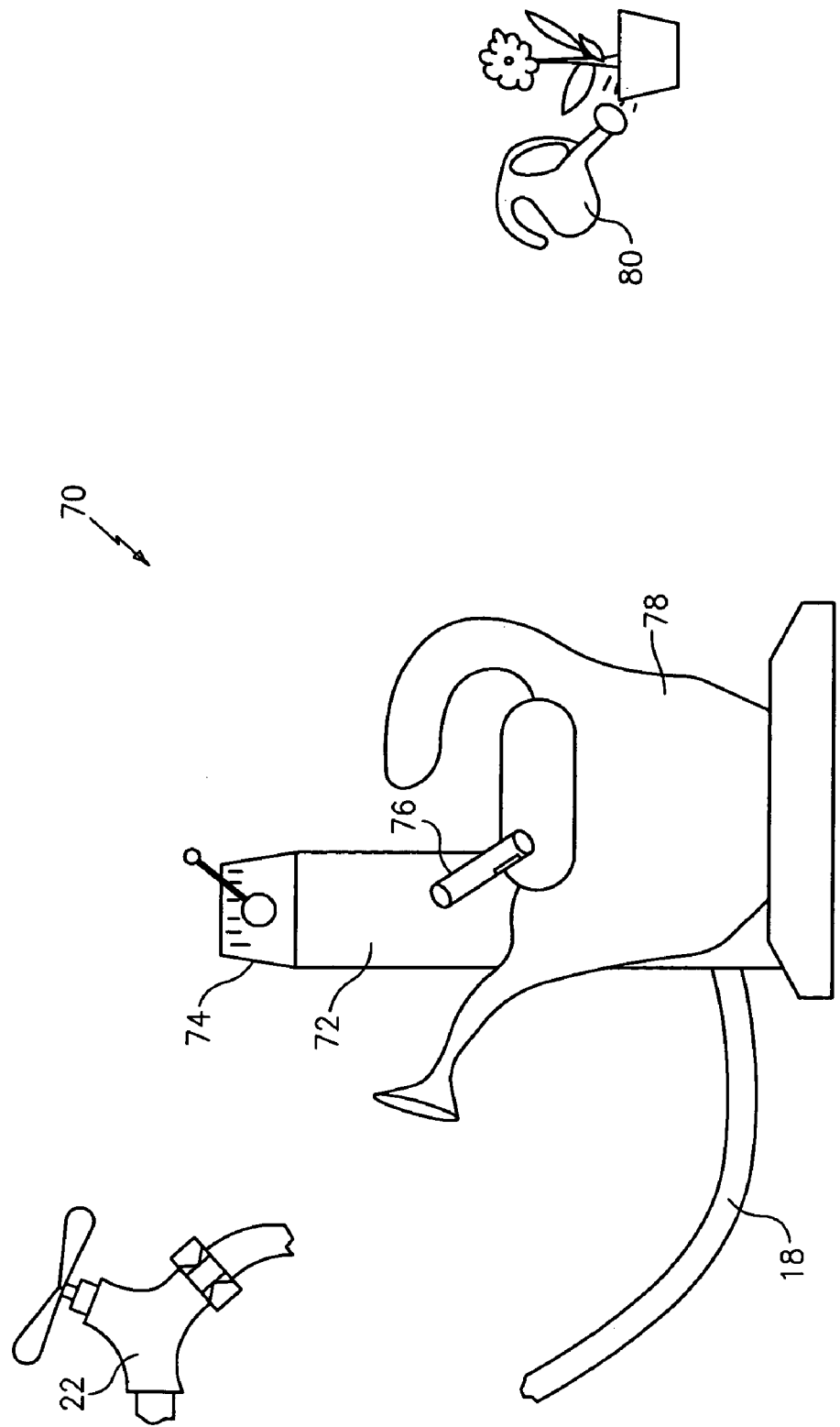
FIG. 3 is a perspective view of a second embodiment of the filling station for watering cans.

Turning now to FIG. 3, a second embodiment 70 of the water filling station comprises: a tank body 72 connected to a house spigot 22 via a standard hose 18; a valve timer 74 operably connected to the tank body 72; and a flexible fill tube 76 operably connected to the valve timer 74.

In use, the filling station 70 can be configured to operate in one of two modes. In the first, the valve timer 74 is manually operated (ie., turned on) to simply fill a first standard watering can 78, wherein when the watering can 78 is full, the valve timer 74 is simply manually turned off. In other words, in the first mode, the valve timer acts as an on/off switch. In the second mode, the valve timer 74 is set for automatic operation, and is used in conjunction with the first watering can 78 and a second watering can 80. More specifically, the first watering can 78, empty, is placed under the fill tube 76 and the valve timer 74 is activated. According to the predetermined size of the watering can, the valve timer 74 causes water to flow into the watering can 78 for a predetermined time until the first watering can 78 is full. Then the valve timer 74 automatically shuts off. Subsequently, the gardener removes the full watering can 78, places the second, empty watering 80 can under the fill tube 76, and again activates the valve timer 74. This fills the second watering can 78 while the gardener waters with the first. In this manner, the gardener never has to wait for a watering can to fill up, except for the first time. The tank body 72 may have an internal reservoir 90 (see FIG. 4) for facilitating partial independence from the supply line pressure. In this case, the valve timer 74 (or another valve unit) would automatically maintain the water in the reservoir at a certain level. Also, the valve timer may be provided with various adjustments, e.g., one that allows a user to change the amount of water outputted by the filling station 70.

In the second filling station 70, the first and second modes can be selected by way of a standard switch 92 or similar mechanism. Additionally, the valve timer 74 can be a mechanical timer, or an electrical timer/timing or control circuit 94, an example of which is shown in FIG. 4.

Figure 4:
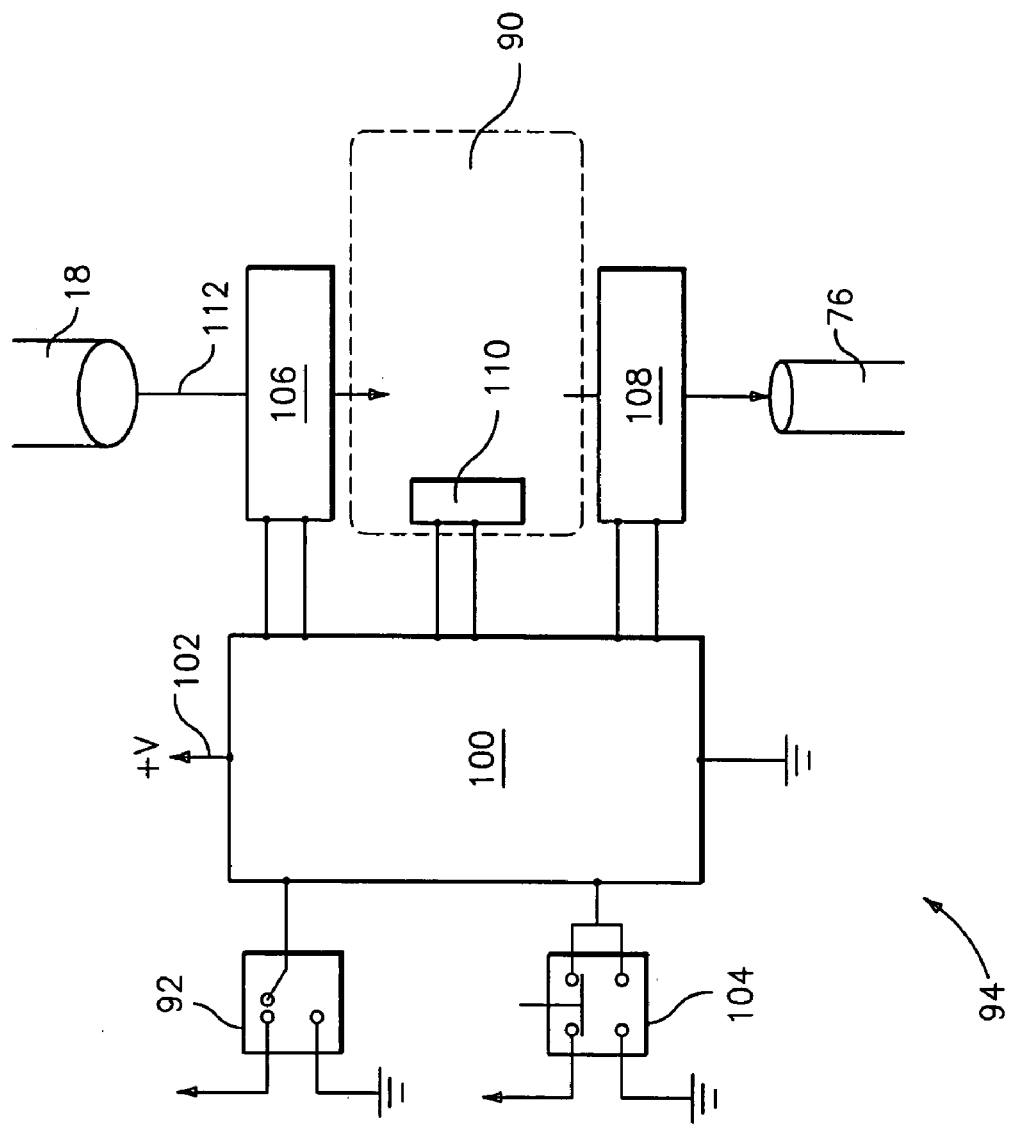
FIG. 4 is a schematic diagram of an electronic control circuit for the second embodiment of the filling station shown in FIG. 3.

FIG. 4 shows an exemplary electrical control circuit 94 (many other timing/control circuits are possible). There, the control circuit 94 is housed in or contiguous to the tank body 72. The control circuit includes a control/timing microcontroller 100 connected to a power source 102 (battery or transformer). A main control switch 104 and the mode select switch 92 are operably electrically connected to the microcontroller 100. Additionally, input and output solenoid valves 106, 108, respectively, as well as an electronic water level sensor 110, are operably electrically connected to the microcontroller 100 (all electric components are connected to suitable power sources). The input solenoid valve 106 is in mechanical fluid communication with the hose 18 and the input of the water reservoir 90, and the output solenoid valve 108 is in fluid communication with the output of the water reservoir 90 and the fill tube 76. Of course, the components are configured with the intent that water 112 flow from the hose 18, through the input valve 106, into the reservoir 90, through the output valve 108, and through the fill tube 76.

The microcontroller 100 is provided with permanently-stored instruction codes for doing the following: (i) monitoring the condition of the main control switch 104; (ii) monitoring the condition of the mode select switch 92; (iii) monitoring the output of the water level sensor 110; and (iv) controlling the solenoid valves 106, 108. In use, when the controller 100 detects that the mode select switch is positioned at a state corresponding to the first mode, the controller 100 will cause the output valve 108 to open, allowing water out, when the main control switch 104 is activated (e.g., turned on), and to close the output valve 108 when the main control switch 104 is again activated (e.g., turned off). Additionally, when the microcontroller 100 detects that the mode select switch 92 is positioned at a state corresponding to the second mode, the microcontroller 100 will cause the output valve 108 to open for a set period of time, corresponding to the amount of time needed to discharge a given amount of water from the reservoir 90 for filling a watering can with a pre-established capacity. The water level sensor 110 is used to make sure there is enough water in the reservoir 90 to fill up the watering can in an allotted, pre-established time period; if not, the microcontroller 100 will wait until the water reservoir 90 is sufficiently full before opening the output valve 108 for the pre-established period of time. In some arrangements, the input valve 106 may be omitted, since it may be better to keep the reservoir pressurized from the hose 18. Also, a water pressure sensor (not shown) may be provided for the microcontroller 100 to calculate the amount of time to open the output valve 108, "on the fly," for variable pressure applications.

Although the filling station for watering cans has been illustrated as having a float valve, other valve units could be used as well. For example, the one or more solenoid-based valves (see FIG. 4) could be used in conjunction with the electronic water level sensor.

Although the tank portion 12 of the filling station for watering cans 10 has been illustrated as being rectangular, one of ordinary skill in the art will appreciate that the tank could also be round or irregular. The tank could also be made out of used containers, such as old barrels.

As should be appreciated, the filling station for watering cans can be adapted for use as part of, or in conjunction with, other elements useful in the garden setting. For example, the filling station could be combined with a potting table or bench. Additionally, it could be adapted to also function as a decorative water fountain. For this, the watering station would be outfitted with an internal water pump (a source of electricity would have to be provided), a fountain discharge nozzle, etc. In use, water could be removed from the reservoir tank for watering, and the float valve would refill the tank when needed. However, at the same time (or perhaps when the filling station was not being accessed for watering), the water pump and fountain discharge nozzle would act to create a decorative water jet or stream. One possible arrangement for this would be to outfit the reservoir lid with a mesh or screen panel, and to include a switch operably connected to the reservoir lid. When the lid was opened, the water pump would be deactivated, and the filling station would be used for watering as described above. When the lid was closed, however, the water pump would be activated, forcing water through the fountain discharge nozzle. The nozzle would be positioned so that the water would fall back down through the screen or mesh panel in the lid and into the reservoir. The mesh panel would be configured to pass water, but to keep out insects and debris.

Since certain changes (including those listed above) may be made in the above described filling station for watering cans, without departing from the spirit and scope of the invention herein involved, it is intended that all of the subject matter of the above description or shown in the accompanying drawings shall be interpreted merely as examples illustrating the inventive concept herein and shall not be construed as limiting the invention.

Having thus described the invention, what is claimed is:

1. A system for filling watering cans comprising:
   a. a tank placed in or near a garden area and having an interior for holding water, wherein the tank includes an opening for accessing the tank interior;
   b. a lid attached to the tank for selectively covering the tank opening;
   c. a water valve mechanism attached to the tank and having an input for attaching to a garden hose or other water source and an output in fluidic communication with the tank interior, wherein the water valve mechanism allows water to pass into the tank interior when an actual water level in the tank is below a pre-established tank water level; and
   d. a garden watering can, wherein:
   e. the garden watering can fits through the tank opening and into the tank interior under the pre-established tank water level for filling the garden watering can with water; and
   f. the garden watering can is filled with water a plurality of time under a volume of water in the tank when the actual water level in the tank is at the pre-established tank water level is sufficient to fill the garden watering can a plurality of times.

2. The system of claim 1 wherein a selected one of the tank and lid is provided with a seal member for creating a seal between the tank and lid when the lid is in a closed position covering the tank opening, for preventing insects and other objects from entering the tank 3. The system of claim 2 wherein the watering can occupies substantially the entirety of the tank interior under the pre-established tank water level when the watering can is fully dipped into the tank interior.

4. The system of claim 1 wherein the tank comprises:
   a. an upper water storage portion in fluid communication with the tank opening and positioned under the pre-established tank water level; and
   b. a lower water storage portion contiguous with the upper water storage portion, wherein: the lower water storage portion is positioned below the upper water storage portion such that when the tank is set upright on a flat surface water in the tank interior tends to drain from the upper water storage portion into the lower water storage portion; and the lower water storage portion is dimensioned to accommodate the garden watering can in an upright position, for filling the garden watering can with water a plurality of times in rapid succession without having to turn the garden watering can on its side.

5. The system of claim 1 further comprising a riser attached to the tank and configured to position the tank in an elevated manner above the ground.

6. The system of claim 5 wherein the watering can occupies substantially the entirety of the tank interior under the pre-established tank water level when the watering can is fully dipped into the tank interior.

7. The system of claim 1 wherein the watering can occupies substantially the entirety of the tank interior under the pre-established tank water level when the watering can is fully dipped into the tank interior.

8. The system of claim 1 wherein the volume of water in the tank when the actual water level in the tank is at the pre-established tank water level is at least about 8 gallons.

9. The system of claim 8 wherein the tank comprises:
   a. an upper water storage portion in fluid communication with the tank opening and positioned under the pre-established tank water level; and
   b. a lower water storage portion contiguous with the upper water storage portion, wherein: the lower water storage portion is positioned below the upper water storage portion such that when the tank is set upright on a flat surface water in the tank interior tends to drain from the upper water storage portion into the lower water storage portion; and the lower water storage portion is dimensioned to accommodate the garden watering can in an upright position, for filling the garden watering can with water a plurality of times in rapid succession without having to turn the garden watering can on its side.

10. The system of claim 8 further comprising a riser attached to the tank and configured to position the tank in an elevated manner above the ground.

11. The system of claim 8 wherein a selected one of the tank and lid is provided with a seal member for creating a seal between the tank and lid when the lid is in a closed position covering the tank opening, for preventing insects and other objects from entering the tank.

12. The system of claim 11 wherein the tank comprises:
   a. an upper water storage portion in fluid communication with the tank opening and positioned under the pre-established tank water level; and b. a lower water storage portion contiguous with the upper water storage portion, wherein: the lower water storage portion is positioned below the upper water storage portion such that when the tank is set upright on a flat surface water in the tank interior tends to drain from the upper water storage portion into the lower water storage portion; and the lower water storage portion is dimensioned to accommodate the garden watering can in an upright position, for filing the garden watering can with water a plurality of times in rapid succession without having to turn the garden watering can on its side.

13. The system of claim 12 further comprising a riser attached to the tank and configured to position the tank in an elevated manner above the ground.

14. A filling station for watering cans comprising:
   a. a tank placed in or near a garden area and having an interior for holding water, wherein the tank includes an opening for accessing the tank interior;
   b. a lid attached to the tank for selectively covering the tank opening; and
   c. a water valve mechanism attached to the tank and having an input for attaching to a garden hose or other water source and an output in fluidic communication with the tank interior, wherein the water valve mechanism allows water to pass into the tank interior when an actual water level in the tank is below a pre-established tank water level; and
   d. a garden watering can having a capacity of at least about 1 gallon, wherein:
   e. the garden watering can fits into the tank interior under the pre-established tank water level for filling the garden watering can with water; and
   f. the garden watering can is filled with water a plurality of time under a volume of water in the tank when the actual water level in the tank is at the pre-established tank water level, said volume being at least about 8 gallons.

15. The filling station of claim 14 wherein the garden watering can has a capacity of at least about 3 gallons, wherein the garden watering can fits into the tank interior under the preestablished tank water level for filling the garden watering can with water.

* * * * *

UNITED STATES PATENT AND TRADEMARK OFFICE
CERTIFICATE OF CORRECTION

| | | |
|---|---|---|
| PATENT NO. | : 7,137,223 B1 | Page 1 of 1 |
| APPLICATION NO. | : 10/795165 | |
| DATED | : November 21, 2006 | |
| INVENTOR(S) | : Douglas K. Purcell | |

It is certified that error appears in the above-identified patent and that said Letters Patent is hereby corrected as shown below:

Column 9, Claim 12, line 9, delete the word "filing" and replace it with the word --filling--.

Signed and Sealed this

Twentieth Day of February, 2007

JON W. DUDAS
*Director of the United States Patent and Trademark Office*